March 26, 1957      A. S. FENEMORE      2,786,416

ELECTRO-MAGNETIC PUMP

Filed Sept. 21, 1954

United States Patent Office 2,786,416
Patented Mar. 26, 1957

2,786,416

ELECTRO-MAGNETIC PUMP

Alan Stephen Fenemore, Stafford, England, assignor to The English Electric Company Limited, London, England, a British company Application September 21, 1954, Serial No. 457,488

Claims priority, application Great Britain September 25, 1953

4 Claims. (Cl. 103—1)

This invention relates to electro-magnetic pumps for pumping electrically conducting liquids. It is concerned with pumps of the kind including an A. C. polyphase winding arranged to establish a magnetic field which passes transversely through a pumping duct and which has a component travelling axially along the duct. In operation, eddy currents are set up in the fluid which react with the magnetic field to produce a force tending to propel the liquid through the duct.

According to the invention, an electro-magnetic pump of this kind comprises, in combination, a tubular pumping duct, an inner magnetic structure disposed within said duct so as to leave an annular passage through which the liquid can flow, an outer magnetic structure surrounding said duct and spaced therefrom so as to leave a relatively small annular air gap therebetween, and a helically wound A. C. polyphase winding—the separate phases of which are disposed in axially interleaved relationship—extending through said air gap and arranged to establish a magnetic field linking said magnetic structures which passes transversely both through said winding and through said annular passage, and which has a component travelling axially along said annular passage, whereby eddy currents are set up in the liquid which react with the magnetic field to produce a force tending to propel the liquid through said pumping duct.

Figure 1:
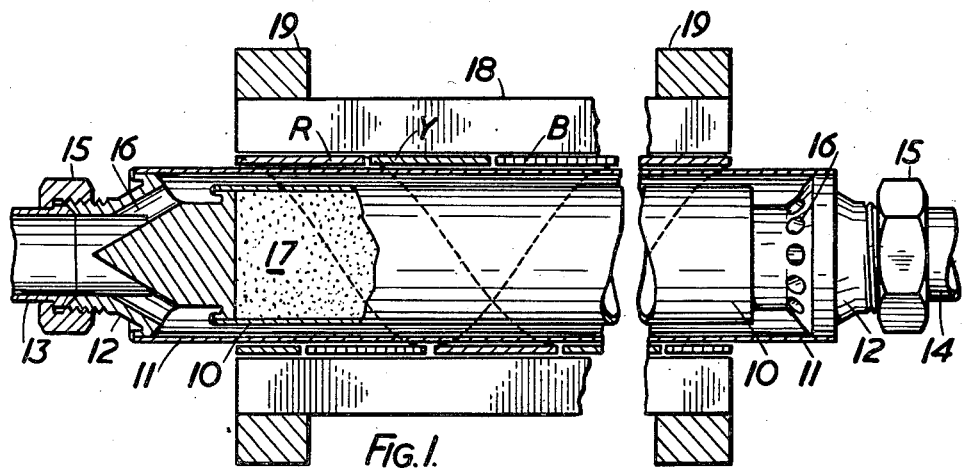
Figure 2:
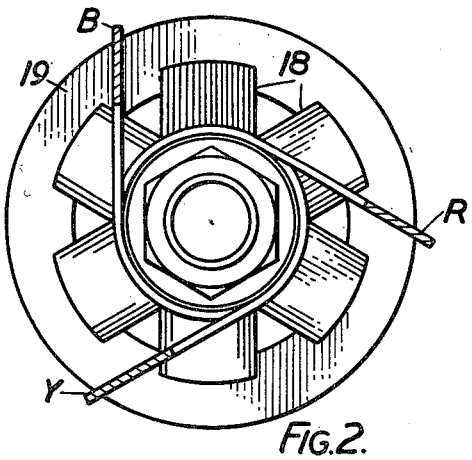
Figure 3:
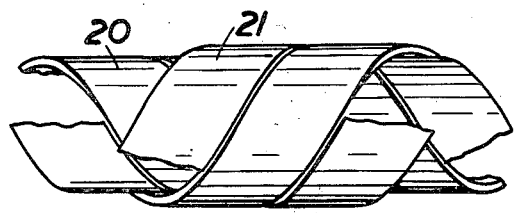

Further features of the invention will appear from the following description with reference to the accompanying drawing. Figs. 1 and 2 show respectively a sectional elevation and an end elevation of a preferred form of pump according to the invention, whilst Fig. 3 shows part of an alternative form of winding for the pump.

Referring now to Figs. 1 and 2, the pump comprises inner and outer concentrically spaced thin-walled metal tubes 10 and 11 respectively which are welded at the ends to non-magnetic end pieces 12. These end pieces are shaped to receive inlet and outlet pipes 13 and 14 respectively which are held in position by clamping nuts 15. Inclined ports 16 in the end pieces allow free flow of fluid through the annular duct formed between the two tubes. The inner tube is filled with iron powder 17.

The travelling magnetic field is established by means of a single layer three-phase A. C. strip winding wound helically round the outer tube 11, the three interleaved phases being indicated at R, Y and B respectively. The magnetic circuit is completed by a number of angularly spaced packs of axially extending laminations 18 fitted round the winding and held in position by non-magnetic clamping rings 19. These rings may be formed from insulating material and, if desired, may be used as an anchor for the ends of the winding.

The winding shown has a phase spread of 120 electrical degrees and has less output than a winding otherwise similar but with a phase spread of 60 electrical degrees. A winding of the latter type may also be used by winding six interleaved helixes, and such a winding may still be fed from a three-phase A. C. source by providing interconnections between the appropriate helixes.

In operation, the winding establishes a travelling magnetic field which passes transversely through the annular pumping duct and which has a component travelling axially along the duct. This sets up eddy currents in the electrically conducting liquid which react with the magnetic field to produce a force tending to propel the liquid through the annular pumping duct.

Since the conductors of the winding are inclined to the axis of the duct, a component of force will also be produced tending to cause rotation of the liquid round the duct. This unwanted component can be avoided by using a double layer winding, the separate phases of each layer being arranged in axially interleaved relationship with the turns of the two layers arranged to spiral in opposite directions so that the rotational components of force due to the two layers substantially neutralise each other. It will, of course, be necessary to connect the two layers either in series or in parallel, so that they assist each other. Part of such a winding is shown in Fig. 3 where the reference 20 indicates the turns of one layer, and the reference 21 the turns of the other layer.

Where a single layer winding is provided, curved guide vanes may be positioned at each end of the pumping duct so as to provide a gradual change in the direction of flow of the fluid entering and leaving the duct. Thus the guide vanes at the inlet end would be arranged to change the direction of flow gradually from an axial to a helical direction whilst the guide vanes at the outlet end would be arranged to change the direction of flow gradually from a helical to an axial direction. These guide vanes may themselves form the walls of ports 16 and may also, if desired, be arranged to extend through the pumping duct from one end to the other.

In either kind of winding the conductors may be subdivided in width, the separate sub-divisions being lightly insulated from each other. The sub-divisions may then be connected in parallel, but preferably they are connected in series, and where the winding is a six-phase winding fed from a three-phase supply, the series connections between the sub-divisions may be arranged in groups at each end.

Windings of this nature are essentially low voltage windings so that only light insulation is needed between phases and to earth, and also between the separate layers when two layers are used. The insulation may be of a kind adapted to withstand high temperatures.

The pump according to the invention is simple in construction, neither slotting of the magnetic structures nor special forming of the turns of the winding being required. If desired, the winding may be positioned between the inner tube and the inner magnetic structure. Windings may alternatively be provided both within the inner tube and outside the outer tube. The windings need not necessarily be three-phase.

What I claim as my invention and desire to secure by Letters Patent is:

1. An electro magnetic pump for electrically conducting liquids comprising, in combination, a tubular pumping duct, an inner magnetic structure disposed within said duct so as to leave an annular passage through which the liquid can flow, an outer magnetic structure surrounding said duct and spaced therefrom so as to leave a relatively small annular air gap therebetween, and a helically wound A. C. polyphase winding—the separate phases of which are disposed in axially interleaved relationship—extending through said air gap and arranged to establish a magnetic field linking said magnetic structures which passes transversely both through said winding and through said annular passage, and which has a component travelling axially along said annular passage, whereby eddy currents are set up in the liquid which react with the magnetic field to produce a force tending to propel the liquid through said pumping duct.

2. An electro-magnetic pump for electrically conducting liquids comprising, in combination, a tubular pumping duct, an inner magnetic structure disposed within said duct so as to leave an annular passage through which the liquid can flow, an outer magnetic structure surrounding said duct and spaced therefrom so as to leave a relatively small annular air gap therebetween, and a double layer helically wound A. C. polyphase winding—the separate phases of which are disposed in axially interleaved relationship—extending through said air gap and arranged to establish a magnetic field linking said magnetic structures which passes transversely both through said winding and through said annular passage, and which has a component travelling axially along said annular passage, whereby eddy currents are set up in the liquid which react with the magnetic field to produce a force tending to propel the liquid through said pumping duct, the turns of the two layers being arranged to spiral in opposite directions, and the two layers being connected together so as to assist each other.

3. An electro-magnetic pump for electrically conducting liquids comprising, in combination, a tubular pumping duct, an inner magnetic structure disposed within said duct so as to leave an annular passage through which the liquid can flow, an outer magnetic structure surrounding said duct and spaced therefrom so as to leave a relatively small annular air gap therebetween, and a helically wound A. C. polyphase winding—the separate phases of which are disposed in axially interleaved relationship—extending through said air gap and arranged to establish a magnetic field linking said magnetic structures which passes transversely both through said winding and through said annular passage, and which has a component travelling axially along said annular passage, whereby eddy currents are set up in the liquid which react with the magnetic field to produce a force tending to propel the liquid through said pumping duct, the turns of said winding being formed from strip material having its minor cross-sectional dimension disposed transversely with respect to the axis of said winding.

4. An electro-magnetic pump for electrically conducting liquids comprising, in combination, a tubular pumping duct, an inner magnetic structure disposed within said duct so as to leave an annular passage through which the liquid can flow, an outer magnetic structure surrounding said duct and spaced therefrom so as to leave a relatively small annular air gap therebetween, and a double layer helically wound A. C. polyphase winding—the separate phases of which are disposed in axially interleaved relationship—extending through said air gap and arranged to establish a magnetic field linking said magnetic structures which passes transversely both through said winding and through said annular passage, and which has a component travelling axially along said annular passage, whereby eddy currents are set up in the liquid which react with the magnetic field to produce a force tending to propel the liquid through said pumping duct, the turns of the two layers being arranged to spiral in opposite directions, and the two layers being connected together so as to assist each other, the turns of said winding being formed from strip material having its minor cross-sectional dimension disposed transversely with respect to the axis of said winding.

References Cited in the file of this patent

UNITED STATES PATENTS

| 2,658,452 | Donelian | Nov. 10, 1953 |

FOREIGN PATENTS

| 543,214 | Germany | June 4, 1929 |
| 558,624 | France | Aug. 3, 1923 |
| 699,925 | Great Britain | Nov. 18, 1953 |